United States Patent
Höfler et al.

(10) Patent No.: US 7,150,932 B1
(45) Date of Patent: Dec. 19, 2006

(54) PRODUCTION OF TUBULAR FUEL CELLS, FUEL CELL MODULES, BASE ELEMENTS AND ION EXCHANGER MEMBRANES

(75) Inventors: Thomas Höfler, Stuttgart (DE); Norbert Stroh, Magstadt (DE)

(73) Assignee: Fraunhofer-Gesellschaft zur Forderung der Angewandten Forschung E.V. (DE)

( * ) Notice: Subject to any disclaimer, the term of this patent is extended or adjusted under 35 U.S.C. 154(b) by 0 days.

(21) Appl. No.: 09/936,117

(22) PCT Filed: Mar. 4, 2000

(86) PCT No.: PCT/EP00/01916

§ 371 (c)(1),
(2), (4) Date: Feb. 1, 2002

(87) PCT Pub. No.: WO00/54358

PCT Pub. Date: Sep. 14, 2000

(30) Foreign Application Priority Data

Mar. 6, 1999 (DE) ................ 199 09 930

(51) Int. Cl.
*H01M 8/14* (2006.01)

(52) U.S. Cl. ............ 429/31; 429/27; 429/32; 429/40; 429/41; 429/42; 429/43; 429/44; 429/140; 429/164; 210/321.78; 210/321.79; 210/321.8; 210/321.81; 210/321.87; 210/321.88; 210/321.89; 210/321.9

(58) Field of Classification Search ............... 210/321.78–321.81, 321.87, 321.88, 321.89, 210/321.9, 484, 487, 497.01, 499, 500.23, 210/507, 508, 660, 679; 429/27, 31, 32, 429/40–44, 140, 164; 502/101
See application file for complete search history.

(56) References Cited

U.S. PATENT DOCUMENTS

| | | | | |
|---|---|---|---|---|
| 4,420,544 A * | 12/1983 | Lawson et al. | ............... | 429/13 |
| 4,694,122 A * | 9/1987 | Visser | ................... | 174/106 R |
| 5,458,989 A | 10/1995 | Dodge | | |
| 5,490,803 A * | 2/1996 | McMills et al. | ............ | 439/276 |
| 6,001,500 A | 12/1999 | Bass et al. | ............... | 429/31 |
| 6,288,328 B1 * | 9/2001 | Brake et al. | ................. | 174/28 |

FOREIGN PATENT DOCUMENTS

| | | |
|---|---|---|
| DE | 19539257 | 10/1996 |
| DE | 19526609 | 1/1997 |
| EP | 0442742 | 8/1991 |
| WO | 9747052 | 12/1997 |
| WO | 9816963 | 4/1998 |
| WO | 9934464 | 7/1999 |

OTHER PUBLICATIONS

EPO English Abstract for DE19539257 (publication date of Oct. 1996).*
Gordon et al. (USGS Primer for Acid Rain-"USGS Tracks Acid Rain", [Fact Sheet FS-183-95], [online].U.S. Dept. of the Interior U.S. Geological Survey. [retrieved on Oct. 31, 2004]. Retrieved from Internet: <URL: http://bqs.usgs.gov/precip/reports/arfs.htm.*
Datasheet for Tubular Braids. [online]. Omegaflex, Inc.-Manufacturers of Flexible Metal Hose and Braid Products. [retrieved on May 9, 2004]. Retrieved from the Internet: <URL: http://www.omegaflex.com/braid>.*

* cited by examiner

*Primary Examiner*—Gregg Cantelmo
*Assistant Examiner*—Alix Echelmeyer
(74) *Attorney, Agent, or Firm*—Ostrolenk, Faber, Gerb & Soffen, LLP

(57) ABSTRACT

The present invention relates to a composite system comprising an electrode and a membrane, which can be used as a fuel cell element or an ion-exchange membrane.

37 Claims, 4 Drawing Sheets

PRODUCTION OF TUBULAR FUEL CELLS, FUEL CELL MODULES, BASE ELEMENTS AND ION EXCHANGER MEMBRANES

The present invention relates to a tubular composite comprising an electron-conducting material and an ion-conducting material, for producing tubular fuel cell elements, fuel cell modules and ion exchange membranes, and to methods for their production.

Fuel cells are characterized in that, using electrodes which generally also have a catalytic action, they are able to convert chemical energy from fuels such as hydrogen, methane in the form of natural gas and biogas, hydrocarbons or methanol directly and efficiently into electrical energy. No pollutants are released during this conversion and, since there are no mechanical components, fuel cells operate without noise and with little wear or maintenance. Fuel cells can be used in power plants, decentralized block-type heating power plants and in mobile applications, such as in vehicles. Depending on the type of energy conversion, fuel cells can be classified into different types. One of these types is the PEM (proton exchange membrane) fuel cell, also known as the membrane fuel cell. The known PEM fuel cells each have, as a unit with an anode and a cathode, a multiplicity of plate-like membranes and electrodes arranged parallel to one another. The supply of oxygen and hydrogen or other fuel gases which is required for operation of this fuel cell takes place separately or alternately into the compartments of such a cell, which are in each case separated from one another by the membrane. Therefore, cells of this type have the drawback, inter alia, that the supply of the energy carriers is complex in terms of equipment. Further drawbacks of these cells are that it is only possible to achieve a low packing density and, on account of concentration gradients over the surface onto which media flow, the efficiency of operation leaves something to be desired.

WO 97/47052 and U.S. Pat. No. 5,458,989 have disclosed cylindrical PEM fuel cells. However, limits are imposed on the dimensions of these fuel cells, on account of their structure and the way in which they are produced. Moreover, producing these fuel cells has drawbacks, in that the winding techniques used to install and fit the electrodes are complex. These winding techniques mean that the cores required for the winding restrict the length of the fuel cell. Moreover, production can only take place discontinuously.

Electrochemical processes in many cases use ion exchange membranes. Ion exchange membranes are used, for example, for mass separation of ionogenic solutions, for electrolysis, for membrane electrolysis and electrodialysis using bipolar membranes, the charged particles being conveyed out of an aqueous solution, in the electric field, through the ion exchange membrane. Processes of this type can be used economically to recover materials of value, for example sodium hydroxide solution or chlorine, for wastewater treatment or to recycle auxiliary substances used in processes.

The ion exchange membranes are usually, in a similar manner to in the fuel cells described above, used in plate form and parallel to one another. The compartmentalization which is brought about by the plate-like, parallel structure requires a dedicated inlet and outlet for the individual compartments. The complicated flow guidance and the correspondingly high number of circuits which have to be installed entail a high outlay on equipment and a high level of maintenance. Moreover, the distance from electrode to electrode in a conventional cell which has ion exchange membranes is therefore limited at its lower end, which leads to a relatively high electrical resistance and therefore a relatively high voltage drop.

In the case of SOFCs (solid oxide fuel cells) of planar design, the gas supply and removal of energy cause problems, on account of the sealing problems. In the case of SOFCs which are designed in tube form, problems arise on account of the poor power density. The high operating temperature, the high heat capacity, the long heat-up time, materials problems and the generally high manufacturing outlay have also proven to be disadvantageous.

Therefore, the present invention is based on the technical problem of providing a device which overcomes the above-mentioned drawbacks, in particular can be used as a fuel cell element, fuel cell module, SOFC basic element and/or ion exchange membrane, in such a way that it is possible to achieve efficient process management with the minimum possible outlay on equipment. The invention is based on the further problem of providing a method for producing the device which can be carried out easily, quickly and continuously and, furthermore, allows the production of fuel cell elements and ion exchange membranes which have not hitherto been available.

The invention solves this technical problem by providing a tubular composite comprising a tubular braid of bundles and/or filaments of an electron-conducting material and a layer of an ion-conducting material arranged above it. A tubular composite of this type, which is designed as a tube or hose, therefore defines a cavity or lumen which is enclosed by the braid, which lies on the inside, and the layer which faces toward the outside, has two end-side openings and separates this cavity from the environment. A tubular composite of this type, in terms of its basic structure, can be used both as an important component of a PEM fuel cell and as a component of an ion exchange membrane, and also as a component of a fuel cell module and as a component of a tubular SOFC basic element. The tubular composites, basic elements, fuel cell modules and/or ion exchange membranes according to the invention can also be used as an important component of a methanol and/or methane fuel cell, for example in a direct methanol fuel cell. The use of a braid of bundles and/or filaments of an electron-conducting material advantageously enlarges the electrode surface of the tubular composite produced in this way, and furthermore it advantageously increases the mechanical strength and is used to tap the current. Moreover, the required porosity for the starting materials to pass through is provided. A tubular composite of this type can be produced continuously, in which case even very small diameters of the composite with short distances between different layers of the electron-conducting material can be achieved. The tubular structure of the composite according to the invention enables a multiplicity of tubular composites, which are arranged with their longitudinal axes parallel to one another, to be combined in a module, in which case efficient use as PEM fuel cell element, fuel cell module, SOFC basic element or ion exchange membrane is possible within a tight space and with small dimensions. The complex flow guidance which is required with the conventional plate-type arrangement of the membranes and the complicated compartmentalization are substantially eliminated.

This leads to further improvements compared to the prior art, such as for example an increase in the power density, the fact that it is easier to supply substances and remove energy, the lower operating temperatures on account of the thinner electrolyte, lower housing temperatures on account of deactivated ends, economic and inexpensive production and a variable flow guidance in the outer space.

In the context of the present invention, the term electron-conducting material is understood as meaning a material which is able to conduct electrons, in particular an electrode, which may be designed either as an anode or as a cathode. According to the invention, the electron-conducting material which functions as an electrode is distinguished by the fact that it also serves as a woven support for the tubular composite and, in a particularly preferred embodiment, has a catalytic activity. The electron-conducting material is designed as a braid comprising bundles and/or filaments. In a preferred embodiment, a braid of this type may contain eight to forty-eight bundles. If, according to the invention, the braid comprises individual fibers, it is preferable to provide up to 120 individual fibers. In a particularly preferred way, the bundles have a diameter of 0.1 to 2 mm, preferably 0.2 to 2 mm, a braid thickness of 0.02 to 0.4 mm, in particular 0.02 to 0.3 mm, preferably 0.1 to 0.2 mm, and a pitch angle of 30° to 60°.

In a further preferred embodiment, the bundles are composed of a number of individual carbon fibers. The number of carbon fibers per bundle is preferably 50 to 1000, in particular 100 to 1000. To improve the electrical conductivity, it is possible for individual bundles of the braid to be replaced by metal-wire bundles or metal wires. According to the invention, it is also possible for individual carbon fibers of a bundle to be replaced by metal wires.

In a particularly preferred embodiment, the diameter of the carbon fibers is 7 to 20 µm, preferably 7 to 12 µm.

Preferably, the internal diameter of the tubular composite is 0.2 to 3 mm, in particular 0.2 to 2 mm.

Therefore, in a further preferred embodiment, the invention provides for the braid, in addition to the carbon-fiber bundles, additionally to have metal wires. Naturally, it is also possible for the braid to have no carbon-fiber bundles at all, but rather to simply form a metal-wire braid or a braid of bundles of a number of metal wires.

Furthermore, it is also possible for wires which are used for stability and to tap current to be introduced, in electrically conductive contact with the braid facing the lumen of the tubular composite, into this lumen. In this case, it is preferable to use individual wires which are bundled in parallel in such a manner that, by way of example, a regular hexagon is formed. However, it is also possible for an individual wire, the outer side of which is structured in the longitudinal direction in such a way that longitudinal channels toward the side facing the braid are formed, i.e. between the composite inner side and the metal wire, to be introduced into the lumen of the braid. The formation of longitudinal channels between the inner braid and the lumen wire or lumen wires can also be achieved by using a stranded conductor.

In a particularly preferred embodiment of the invention, the metal wires are precious-metal wires or wires made from corrosion-resistant metals or alloys, for example nickel, platinum, palladium, gold or silver wires or wires made from stainless steel. The diameter of these wires is, in a preferred embodiment, from 10 to 300 µm, preferably from 10 to 150 or 150 to 250 µm. Naturally, however, it is also possible, according to the invention, to use other metals or metal alloys. The invention also comprises the use of materials which are only electrically conductive under certain conditions, such as superconductors or semiconductors, in or as the braid of the electron-conducting material.

In the context of the present invention, the term ion-conducting material is understood as meaning a medium which is able to conduct ions, i.e. an electrolytic material. The ion-conducting material which can be used according to the invention may be solid, for example a solid oxide, metal oxide, a fused salt, etc., or liquid, for example an aqueous salt solution. The ion-conducting material is preferably designed as a membrane, in particular as a technical, i.e. synthetic membrane, in which case, if necessary, the ion-conducting material has crosslinking additives and may consist, of organic materials, for example polysulfones, polyether sulfones, polyether ketones, polyether ether ketones or other aromatic polyaryl ethers, or of inorganic materials, for example aluminum oxide, zirconium oxide, carbon fibers, or may contain these materials with any use of ionic conductors which may be necessary. In a particularly preferred embodiment, the membrane has a thickness of from 10 to 150 µm. According to the invention, it is also possible to use ampholytes or polyelectrolytes. Particularly preferably, the invention comprises the use of a solid oxide or polymer, in particular of the electrolyte NAFION® or other sulfonated perfluorinated polymers or sulfonated aromatic polyether ether ketones or other anionic polyaryl ethers, including in the form of copolymers or blends. When using a solid electrolyte, to achieve a suitable conductivity it is necessary for there to be a correspondingly high water content. The use of a membrane as ion-conducting material, which is particularly preferred according to the invention, may also take place in the form of membranes which have functionally and/or structurally different areas, for example bipolar membranes.

In a preferred embodiment, the invention relates to a tubular composite comprising a braid of bundles and/or filaments of an electron-conducting material and a layer of an ion-conductive material arranged above it, the tubular composite being designed as a fuel cell element and in each case at least one catalyst layer being arranged both between the braid of bundles and/or filaments of an electron-conducting material and the layer of an ion-conducting material and above the layer of the ion-conducting material, and the outwardly oriented, that is to say the upper, catalyst layer being covered by a further braid of an electron-conducting material. During the production process, the catalyst layer also penetrates into the braid and its interspaces, so that an intimate bond is formed between the braid and the catalyst layer, without a sharp spatial separation. The braid may also at least partly press into a catalyst layer which lies below it.

Naturally, a tubular composite of this type can be used not only as a fuel cell element but also as an oxygen, hydrogen, carbon monoxide, methanol or methane sensor.

The at least one catalyst layer is used to convert the substance which is supplied as fuel or as the substance which is to be measured, for example hydrogen, oxygen, methane, methanol, hydrocarbons or carbon monoxide, into an ion. According to the invention, this layer or these layers can also be dispensed with, for example if catalytically active metal wires or carbon fibers or metal wires which are coated with a catalytically active substance are provided in the braid. The catalytically active substance of this type which is used may be one or more elements from subgroup VIII of the periodic system of the elements, for example platinum, palladium, ruthenium, rhodium, iridium and nickel or alloys thereof, if appropriate together with carbon, for example in the form of graphite, in particular graphite powder, soot or charcoal, in particular activated charcoal. According to the invention, it is also possible for a plurality of different catalysts or catalyst layers to be formed in the immediate spatial vicinity of one another or as a single unit.

The thickness of a catalyst layer is preferably from 1 to 70 μm.

In a particularly preferred embodiment, the invention relates to a PEM fuel cell element as explained above, in which the catalyst layer contains or consists of a platinum/carbon or palladium/carbon mixture.

In a further preferred embodiment, the catalyst layer has hydrophobic and/or proton-conducting material additives, for example powder of aromatic polyether ether ketone, PTFE powder, NAFION® or electrolytes.

A fuel cell element of this type, for example a PEM or SOFC fuel cell element, may, according to the invention, have an internal diameter of from 200 to 3000 μm, preferably 200 to 2000 μm.

A large number of fuel cell elements according to the invention may be combined, with their longitudinal axes parallel to one another, to form a module. In this case, they allow the flow of the starting materials, for example hydrogen and oxygen, to be guided in the form of a crosscurrent, countercurrent, cocurrent and a mixed flow, with the result that resistances to mass transfer are minimized and propulsive forces are kept high, leading to improved efficiency. At the same time, a high packing density allows a high power density to be attained. To achieve the required current and the required voltage, the fuel cell elements may be connected in parallel or in series.

The current from the outer electrodes, i.e. the outer braid, which faces toward the surface, of the tubular composite, may also be tapped by making contact with an external connection, in particular comprising corrosion-resistant, electrically conductive materials, such as wires, grids, woven fabrics or electrically conductive strips through which fluid can flow, or plates, on individual fuel cell elements or on fuel cell elements which have been combined with their longitudinal axes parallel to one another to form a plane. These electrically conductive materials may comprise corrosion-resistant metals or metal alloys, but may also comprise graphite, carbon or other electrically conductive and corrosion-resistant materials. The shape of these electron-conducting materials may be matched to the shape of the tubular composites, so that optimum electrical contact is produced between the two. To electrically separate and insulate the fuel cell element layers, it is possible to use electrically nonconductive materials, such as for example nonconductive plastics and nonconductive ceramics, in the form of, for example, wires, grids, woven fabrics and gas-permeable strips and plates.

The invention therefore allows, for example, molecular hydrogen to be fed into and through the cavity of the tubular composite. The molecular hydrogen leaves the cavity of the tubular composite, penetrates through the braid of bundles and/or wires of an electron-conducting material which is designed as an anode and at the same time acts as a porous layer, and in the process, as in the catalyst layer arranged above it, is converted into individual hydrogen atoms and ultimately protons. The protons migrate through the ion-conducting layer arranged above the catalyst layer, for example the membrane, toward the braid of an electron-conducting material, which is designed as a cathode. By way of example, oxygen or an oxygen-containing gas mixture, such as air, which is situated outside the tubular composite and is fed to a module, for example perpendicular, parallel or in the opposite direction to the flow of hydrogen, comes into contact with the outer braid of the electron-conducting material. There and at the catalyst layer which immediately follows it on the inner side, the molecular oxygen is converted into oxygen atoms and oxygen ions. The oxygen ions and protons which meet in the region of the inner membrane form water which, as water vapor, is discharged on the one hand through the membrane into the lumen and on the other hand through the catalyst layer and the cathode into the outer space. At the same time, electricity is generated.

The fuel may also be supplied via the outer side of the tubular composite, so that the air, the oxygen or a different oxidizing agent is supplied via the lumen.

Naturally, the invention also provides for the catalyst layer to be integrated in the braid of the electron-conducting material, i.e. for the catalyst layer to completely or partially cover the individual bundles, fibers and/or filaments of the braid of electron-conducting material and/or to be arranged between these elements. Therefore, according to the invention it is not necessary for there to be a distinct spatial separation between catalyst layer and anode or cathode.

The tubular composite can be used not only as a fuel cell element but also as an electrolyzer.

The invention also relates to a tubular composite comprising a braid of bundles and/or filaments of an electron-conducting material and a layer of an ion-conductive material arranged above it, the tubular composite being designed as an ion exchange membrane, and a spacer, which is used to increase the volume through which medium can flow, preferably being arranged between the braid of electron-conducting material and the layer of an ion-conducting material. According to the invention, it is possible for the spacer to be designed as a braid of bundles and/or fibers of an ion-conducting or neutral, i.e. electrically insulating, material. By way of example, the spacer may consist of or contain polypropylene, polyethylene, ion exchange material or the like. Preferably, the braid which is in the form of a spacer is coarser, i.e. has a lower braid density, for example of 1 to 20% coverage, and a lower pitch angle, for example of 10° to 45°, of the ion-conducting or neutral fibers or bundles.

The ion-conducting material may be designed as a cation exchanger or an anion exchanger. Naturally, it is also possible for a plurality of layers of one or different ion-conducting materials to be arranged on top of one another. The invention also relates to the use of a bipolar membrane as a layer of an ion-conducting material.

In a further preferred embodiment, it is possible to provide an above-mentioned ion exchange membrane which, above the layer of an ion-conducting material, has a further spacer and a further braid of an electron-conducting material. This layer sequence of spacer and electron-conducting material can be used as a counterelectrode. The latter arrangement of spacer and electron-conducting material as counterelectrode can be dispensed with if the ion exchange membranes are combined in a module with a collector electrode.

The invention therefore provides that an ion exchange membrane according to the invention is combined with a large number of further ion exchange membranes of this type to form a module. Preferably, a module of this type may have a frame and a matrix which fixes the ion exchange membranes, which are arranged with their longitudinal axes parallel to one another. A structure of this type may also be provided for the modular structure of a fuel cell according to the invention.

The frame is preferably made from plastic or corrosion-resistant metal. According to the invention, it is preferable for the matrix to be made from thermoplastic polymers, thermosetting polymers or solid oxides.

In a further preferred embodiment, the invention relates to a tubular SOFC basic element, which is constructed from a plurality of layers in the following way: by way of example, the base used for all further layers is a metal braid, which advantageously consists of nickel. The metal braid is used in particular to improve the mechanical stability and to tap current. This metal braid is surrounded by a coarse-pore electrode material, in which the anode may consist, for example, of Ni-YSZ (yttrium-stabilized zirconia) cermet and the cathode may consist of strontium-doped lanthanum manganate. The coarse-pore electrode material is embedded in a fine-pore electrode/catalyst layer, i.e. the course-pore electrode material is surrounded by the fine-pore electrode/catalyst layer. An electrolyte layer, which consists, for example, of yttrium-stabilized zirconia (YSZ), is applied to the electrode/catalyst layer. Then, a fine-pore electrode/catalyst layer is applied to the electrolyte layer obtained in this way. The layer structure obtained in this way is surrounded by a metal braid, for example of nickel, combined with coarse-pore electrode material, for example of Ni-YSZ cermet for the anode and strontium-doped lanthanum manganate for the cathode. The application of the metal braid in combination with the coarse-pore electrode material to the fine-pore electrode/catalyst layer advantageously takes place in a combined process step. The continuous layer structure obtained in this way is fabricated from at least one end—i.e. outer and inner electrode—over, for example, soldered or cold-welded end sleeves which are electrically conductive on one side. The tubular structure advantageously allows a continuous build-up of layers using integrated sintering steps, which can preferably be combined with a plasma-spraying process. A thin electrolyte film of 30–600 µm, preferably 20 to 200 µm, for preference 30 to 80 µm, in particular 30 to 50 µm, advantageously allows an operating temperature of 600 to 1000° C., preferably 700 to 850° C. The external diameter of the braid which is obtained in a continuous production process is 0.25–10 mm, preferably 0.8 to 1.5 mm.

In a further preferred embodiment, the invention relates to a module configuration in which the materials are matched in terms of their coefficient of thermal expansion. The design measures which are explained below advantageously prevent temperature-related, excessive material stresses, such as for example by deactivation of the ends in order to reduce the boundary temperature. This design measure advantageously means that there are fewer or no sealing problems caused by differences in thermal expansion between fuel cell and housing. A further expedient design measure is, for example, the hairpin or loop shape or curvature of the tubular basic elements in the module or the slidable potting on one side.

However, a ceramic housing with matching thermal expansion is also a further advantageous design measure. The ceramic housing may advantageously be embedded in a metal housing, in order to facilitate connection of the working media and tapping of the current. However, temperature-related, excessive material stresses can also advantageously be avoided by means of a soldering glass which is close to the melting point during the operating state. A further possibility is, for example, to use an electrically insulated, elastic metal ring as a seal between housing and capillary packing, as used, for example, in the metal ceramics used in the dental technology field. The fuel cell module may advantageously be constructed in such a way that it can operate in crosscurrent, cocurrent and/or countercurrent mode.

Preferably, the fuel cell module and the basic element can be used to generate energy or for traction, for example as a drive for, for example, motor vehicles, trucks, buses and flying vehicles.

The tubular basic element and the fuel cell module advantageously allow a tubular solid oxide fuel cell which is easy to produce, can heat up rapidly on account of the saving of material and therefore is quickly ready to operate to be produced. The tubular design advantageously allows embedding in a housing, which, for example by comparison with the known flat cell design, makes it significantly easier to supply gas and remove energy. The thinner electrolyte layer allows operation at 600 to 1000° C., preferably from 700 to 850° C. Designing the individual elements with a tubular geometry and on the millimeter scale from 0.25 to 10 mm, preferably from 0.8 to 1.5 mm, advantageously enables a high power density of the fuel cell module to be achieved.

The invention also relates to a method for producing a tubular composite according to the invention, the method being distinguished by the fact that it can be carried out continuously. According to the novel method, in a first method step bundles of carbon fibers and/or metal wires of an electron-conducting material are braided to form a hose, for example by means of a conventional braiding machine. The electron-conducting material of the invention, which is preferably designed as a braid of bundles of carbon fibers and/or metal wires, depending on the particular application of the tubular composite, is braided in such a way that the substances which are to be carried, such as hydrogen, oxygen, ions and liquids, are able to pass through the braid, i.e. the braid is porous. At the same time, the braid is designed in such a way that it serves as a woven support for the tubular hose and provides the latter with the required flexibility and strength while, at the same time, having a high resistance to corrosion. The braid density and the pitch angle of the individual braided bundles are matched to the desired diameter of the hose. If the hose is to be produced substantially from carbon-fiber bundles, it is possible to add metal wire bundles, in order to increase the electrical conductivity. There may advantageously also be a large number of metal wires in the lumen of the braid. As an alternative to a metal-wire bundle, it is advantageously also possible to use an individual wire which has been structured in a star shape on its outer side. The connection is as a parallel or series circuit. The braided hose is then, in a second method step, covered with an ion-conducting layer on its outer side, i.e. the side which is remote from the hose cavity, for example by means of pouring nozzles or spraying nozzles. If appropriate after drying, this layer preferably forms an ion-conducting, in particular ion-selective membrane.

To produce a PEM fuel cell element, immediately following the braiding of the hose a catalyst layer, preferably including hydrophobic and/or proton-conducting material additives, is applied to the braid, preferably in the form of a paste via a continuous nozzle. The application of this layer eliminates the unevenness of the braids, so that a smooth surface is produced, which forms an excellent basis of the application of the ion-conducting layer which is subsequently applied. According to the invention, it is also possible for a compensation layer to be applied to the braid in order to eliminate the unevenness. To save catalyst material, this compensating layer may contain charcoal, in particular activated charcoal, graphite, in particular graphite powder, soot or mixtures thereof, preferably together with binders, for example polymers. Then, the catalyst layer is applied to this compensation layer. The application of the layer of an ion-conducting material takes place as explained above, with layer thickness of from 10 to 150 μm being preferred. After any drying which may be required, a further catalyst layer is applied, as described above. A further compensation layer, as described above, may preferably be applied to this catalyst layer. Then, an outer braid of an electron-conducting material comprising bundles and/or filaments is braided around this composite. The braids used have a braid density of 50 to 97%, preferably 50 to 90%, comprise individual strands of 50 to 1,000, preferably 100 to 1,000 fibrils, it being possible for each fibril to have a diameter of between 7 and 20 μm, preferably 7 and 12 μm, and to comprise carbon fibers and/or metal wires. If appropriate, it is also possible to use individual strands which do not comprise fibrils, but rather comprise solid or hollow fibers. The braid angle is between 30° and 60°.

The SOFC fuel cell elements are produced as explained above for the PEM fuel cell elements, except that no hydrophobic additives are used, and a sintering operation under standard conditions takes place after the drying.

To produce an ion exchange membrane, a hose of bundles and/or filaments of an electron-conducting material, for example carbon fibers or metal wires, is braided, for example by means of a conventional braiding machine. This braid has a coarser structure than the braid for a fuel cell element, a braid density of 5 to 60% and a braid angle of 10 to 45° being preferred. The braids comprise individual strands with from 50 to 1000, preferably 100 to 1000 fibrils, it being possible for each fibril to have a diameter of from 7 to 20 μm, preferably 7 to 12 μm, and to comprise carbon fibers and/or metal wires. If appropriate, it is possible also to use individual strands which do not comprise fibrils, but rather solid or hollow fibers.

To increase the volume through which medium can flow, a further coarse braid made from electrically insulating or ion-conducting material is applied as spacer above this braid, which functions as an electrode, a braid density of the further coarse braid of from 1 to 20% coverage and a pitch angle of from 10° to 45° being preferred. The diameters of the individual fibers of the spacer braid are preferably 50 to 300 μm, preferably 50 to 100 μm. Before the ion-conducting layer is applied, an intermediate layer of a material which can easily be washed out, such as PVA (polyvinyl alcohol), which is temporarily present, is applied as a base for the application of the ion-conducting layer.

This intermediate layer, which is temporarily present, forms the base for the ion exchange membrane, which is preferably in the form of a thin film and is applied through application of a solution or by spraying. If it is necessary to apply a counterelectrode, a further spacer made from ion-conducting or neutral, i.e. electrically insulating, material is then braided around the layer of ion-conducting material, followed by the braiding of a braid of an electron-conducting material, which serves as outer electrode. After the composite has been completed, the intermediate layer is washed out.

The invention is explained in more detail below with reference to the figures and associated examples. In the drawing:

FIG. 1 shows a cross section through a tubular composite which is designed as a fuel cell element, FIG. 2 shows a cross section through a tubular composite which is designed as an ion exchange membrane without counterelectrode, FIG. 3 shows a cross section through a tubular composite which is designed as an ion exchange membrane with counterelectrode, FIG. 4 shows a cross section through a module comprising a multiplicity of tubular composites, FIG. 5 shows a perspective side view of a module of the present invention, FIG. 6 shows a partially sectional plan view of a fuel cell element according to the invention, FIG. 7 shows a cross section through a tubular composite, with a metal wire with extensions having been introduced into the lumen, FIG. 8 shows a cross section through a tubular composite with the metal wires which are present in the lumen being formed as a stranded conductor, FIG. 9 shows a cross section through a tubular composite, with metal wires which form a stranded conductor having been introduced into the lumen, FIG. 10 shows a perspective side view of a module comprising tubular composites with a grid of electrically conductive material as outer connection for tapping current from the outer electrodes, the individual tubular composites being connected in parallel, FIG. 11 shows a perspective side view of a connection of two modules in series, each module comprising a frame and a multiplicity of tubular composites which are connected and arranged in parallel, it of course being possible for the tubular composites within a module also to be connected in series instead of in parallel, FIG. 12 shows a perspective side view of a series circuit of two tubular composites, and FIG. 13 shows a perspective side view of a parallel circuit of two tubular composites.

FIG. 1 shows a cross section through a tubular composite 1 which is designed as a fuel cell element. The tubular composite comprises a braid 3 of bundles and/or filaments of an electron-conducting material and a catalyst layer 7 which is arranged above the braid and above which, in turn, a layer 5 of an ion-conducting material is applied. A catalyst layer 9 is arranged on the layer 5. The catalyst layer 9 is surrounded by a braid 11, the braid 11 comprising bundles or metal wires of an electron-conducting material.

FIG. 2 shows a cross section through a tubular composite 1 which is designed as an ion exchange membrane without a counterelectrode. The tubular composite 1 comprises three different layers which are arranged so as to directly follow one another. As in the exemplary embodiment shown in FIG. 1, the braid 3 is arranged in the core. The braid 3 is surrounded by a neutral spacer 13. The spacer 13 is covered by the ion-conducting layer 5.

FIG. 3 shows a cross section through a tubular composite 1 which is designed as an ion exchange membrane with counterelectrode and has the same number of layers as the exemplary embodiment shown in FIG. 1. The braid 3 forms the layer arranged toward the center of the tubular composite, to which the neutral spacer 13 is applied. The spacer 13 is covered by an ion-conducting layer 5, above which is the spacer 15. An electron-conducting braid 17 forms the outer layer.

FIG. 4 shows a cross section through a module 50 which is composed of a large number of tubular composites 1 and a cylindrical frame 52. The frame 52 surrounds the multiplicity of tubular composites 1 in such a way that, within the cylindrical frame 52, they have as far as possible an ordered structure.

FIG. 5 shows a perspective side view of the module shown in FIG. 4, which is composed of a multiplicity of tubular composites 1 and a frame 52. Composites 1 are arranged in a matrix 54 within frame 52.

FIG. 6 shows a partially sectional plan view of the fuel cell element according to the invention as shown in FIG. 1. The tubular composite comprises the braid 3 of the electron-conducting material and the catalyst layer 7 which is arranged above it and is surrounded by the layer 5 of an ion-conducting material. The layer 5 is covered by the catalyst layer 9. The outer braid 11 surrounds the catalyst layer 9.

FIG. 7 shows a cross section through a tubular composite 1, a metal wire 21 with extensions 23 having been introduced into the lumen 19. The extensions 23 are arranged in such a way that they are in contact with the braid 3. The braid 3 is covered by a combined catalyst layer 77, which also comprises other layers, such as compensation layers. A braid 11 once again forms the outer layer of the tubular composite 1. The lumen 19 is designed in such a way that gaseous and/or liquid fuels can be passed through it.

FIG. 8 shows a cross section through a tubular composite 1, the metal wires 21 being structured as a stranded conductor and being present in groups 25.

FIG. 9 shows a cross section through a tubular composite 1, which is designed substantially as in the exemplary embodiment shown in FIG. 7, with metal wires 21, which form stranded conductors, having been introduced into the lumen 19 of the tubular composite 1. The metal wires 21 which have been introduced into the lumen 19 are used to provide stability and to tap current. The seven metal wires 21 are bundled in such a manner that a regular hexagon is formed.

FIG. 10 shows a perspective side view of a module 50 comprising tubular composites 1 with an outer connection, which is designed as an electron-conducting grid 31, for tapping current from the outer electrodes, the individual tubular composites 1 being connected in parallel. Air is passed into the module 50 in the direction indicated by arrow 27, and fuel gas enters the module 50 in the direction indicated by arrow 29. The tubular structure of the composite 1 enables a large number of tubular composites 1, which are arranged with their longitudinal axes parallel to one another, to be combined in a module 50, and efficient use as a PEM fuel cell element, a fuel cell module, an SOFC basic element or an ion exchange membrane being possible within a tight space and with small dimensions.

EXAMPLE 1

Production of a PEM Fuel Cell

Figure 1:
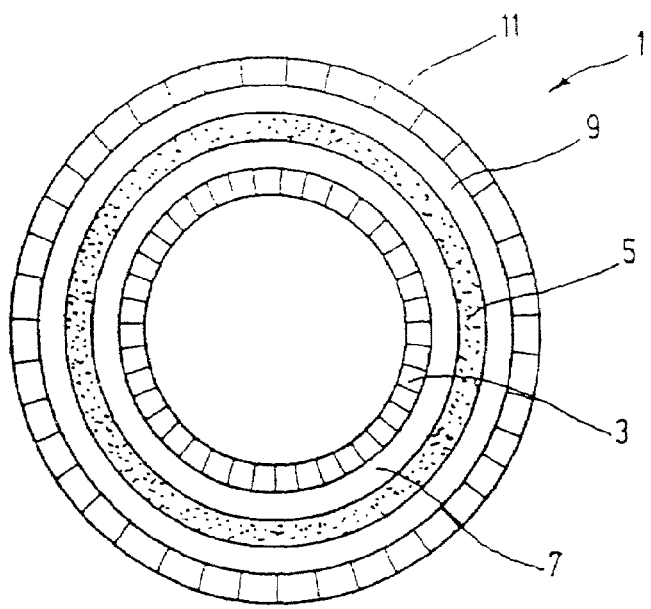
Figure 2:
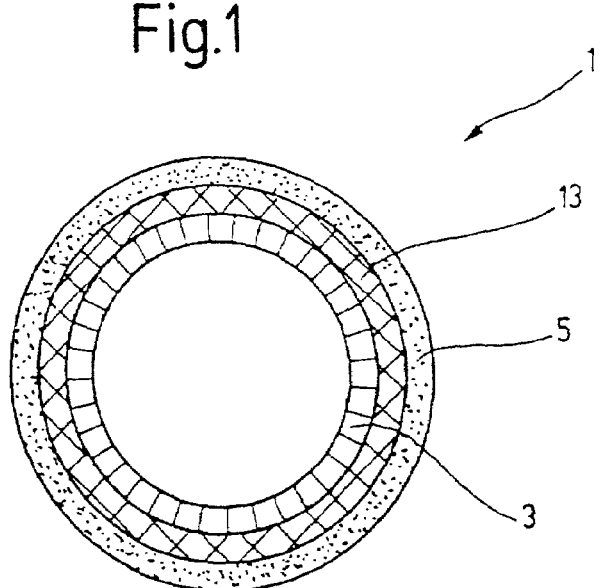
Figure 6:
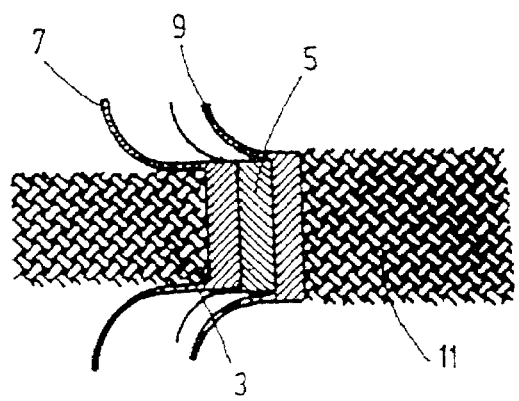
Figure 3:
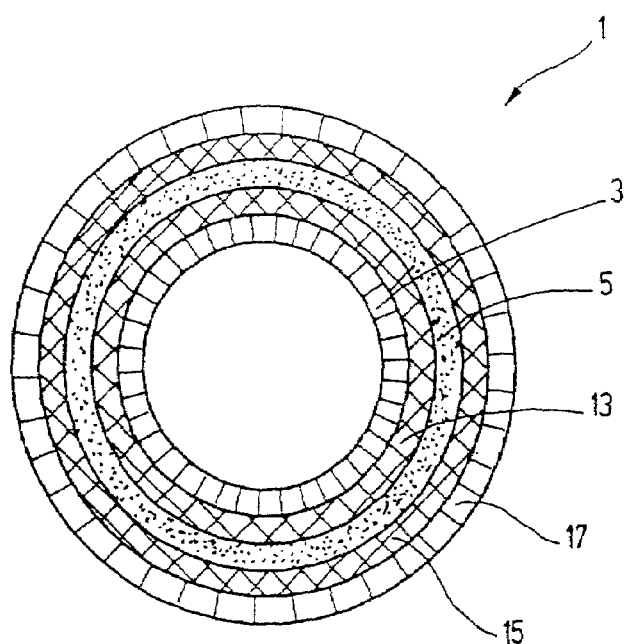
Figure 4:
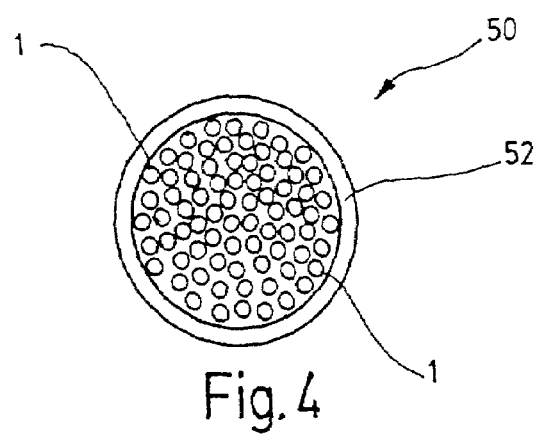
Figure 5:
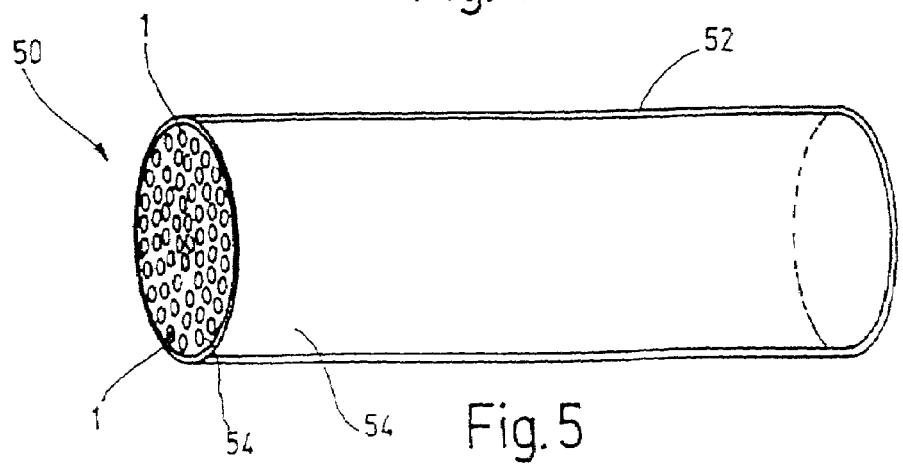
Figure 7:
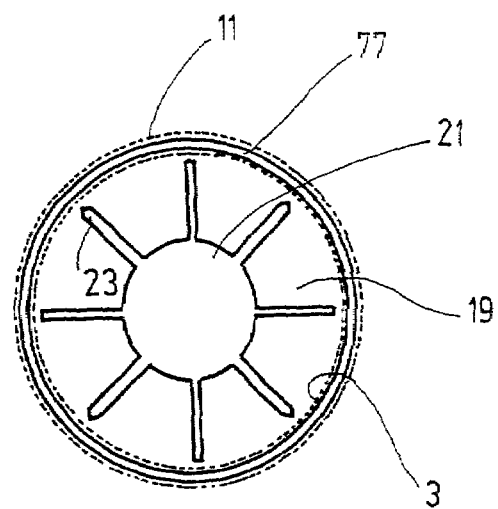
Figure 8:
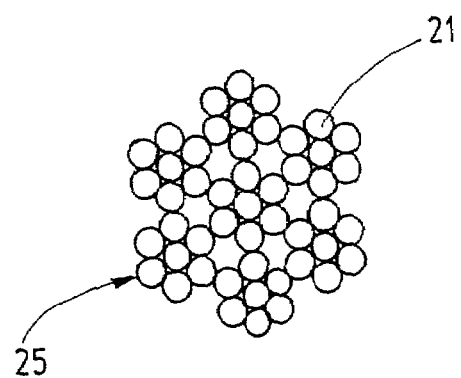
Figure 9:
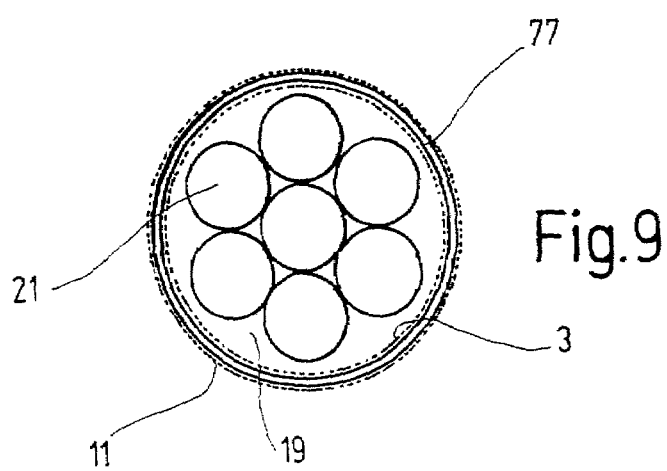
Figure 10:
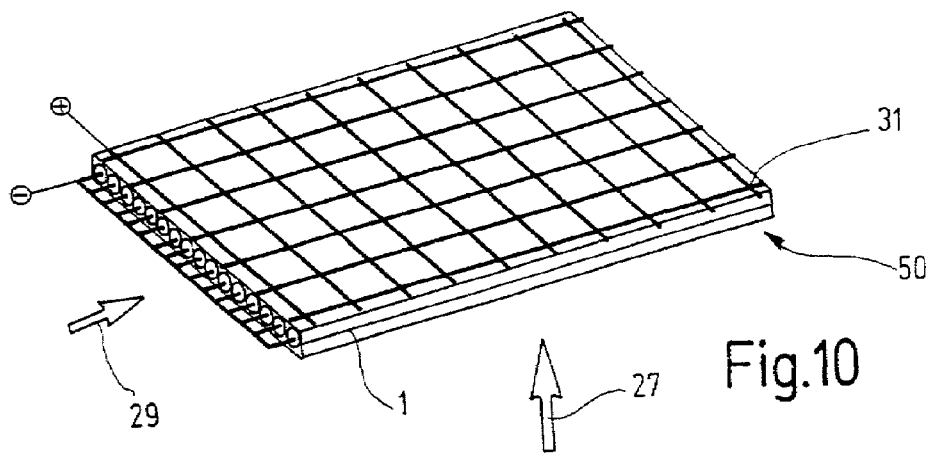
Figure 11:
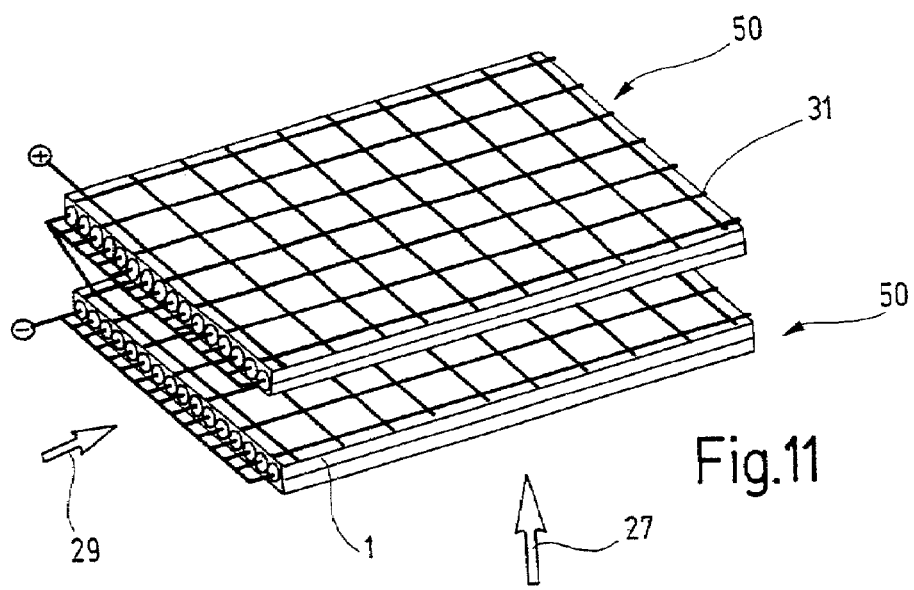
FIG. 11 shows a perspective side view of a connection of two modules in series, substantially corresponding to the structure shown in FIG. 10. A difference, however, is that the module 50 is connected in series with a second module 50.
Figure 12:
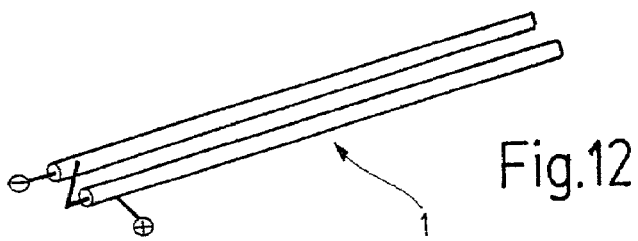
FIG. 12 shows a perspective side view of a series circuit of two tubular composites 1. The series circuit is used to achieve the required voltage.
Figure 13:
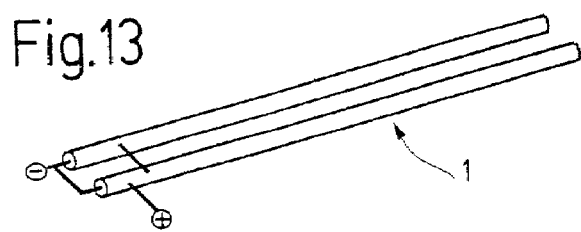
FIG. 13 shows a perspective side view of a parallel circuit of two tubular composites 1.

A braiding machine is used to produce the tubular inner electrode (comprising carbon fibers and/or metal wires). In order to be centered, this tubular braid runs onto a mandrel up to the application nozzle for the catalyst coating. The nozzle diameter in this case determines the thickness of the catalyst layer. After a short drying section by, for example, ceramic heating bodies, the coated braid passes through an annular nozzle, via which the ion-conductive membrane is applied in the form of a polymer solution or, alternatively, in the form of a solid oxide. This step is followed by a longer drying section in order to expel the solvent. Next, the second catalyst layer is applied using an applicator nozzle. Then, the outer electrode is braided around the catalyst layer, which is still in paste form. The pasty consistency of the catalyst layer allows the braid strands to penetrate and therefore enables an intimate bond to be formed between catalyst and electrode. Finally, the hollow fiber passes through a final drying section.

EXAMPLE 2

Use of a PEM Fuel Cell

The PEM fuel cell can be used in block-type heating power plants, motor vehicles, flying vehicles, small appliances and domestic households in order to generate current.

EXAMPLE 3

Production of an Ion Exchange Membrane

A braiding machine is used to produce the tubular inner electrode (comprising carbon fibers and/or metal wires). In order to be centered, this tubular braid runs onto a mandrel into a second braiding machine, at which the coarser spacer braid is applied. This is followed by the application of the intermediate layer which can be washed out (for example polyvinyl alcohol). After an optional drying section, in which controlled shrinkage can be utilized to increase the surface area, the ion exchange membrane is applied in the form of a polymer solution or a solid oxide aerosol, using a nozzle, and then the solvent is expelled in a drying section. If the ion exchange membrane is to be a bipolar membrane, the first membrane coating is followed by a further coating in the form of a polymer solution, in which case this polymer or the solid oxide has the opposite charge from the first membrane layer. The solvent is expelled in an additional drying section.

In the next method step, the coarse spacer braid and the outer electrode, in the form of carbon fibers and/or metal wires, are braided around the hollow fiber. If the tubular ion exchange membrane is used in a module with a collector electrode, the final two braiding steps are omitted. The soluble intermediate layer in the spacer between inner electrode and ion exchange membrane is washed out before the production of the module or before the tubular ion exchange membrane starts to be used.

EXAMPLE 4

Use of an Ion Exchange Membrane

The ion exchange membrane can be used, for example, to desalinate process and wastewaters. When using bipolar ion exchange membranes, it is also possible to produce lyes and acids from the corresponding salts, for example to obtain lactic acids and calcium hydroxide from lactate.

The invention claimed is:

1. A tubular composite (1) comprising a braid (3) of an electron-conducting material, a layer (5) of an ion-conducting material arranged above the braid and a further braid (11, 17) of an electron-conducting material, wherein the braid (3) of electron-conducting material comprises bundles of electron-conducting material selected from the group consisting of carbon fibers and metal wires, wherein the further braid (11, 17) of electron-conducting material comprises bundles of electron-conducting material selected from the group consisting of carbon fibers and metal wires, wherein the tubular composite is configured as a tube or hose and defines a cavity or lumen, which is enclosed by the braid (3) which lies toward the inside of the composite, the further braid (11, 17) which lies toward the outside of the composite and the layer (5) of ion-conducting material, which lies between the braid (3) and the further braid (11, 17) and wherein the composite has two end-side openings, and wherein said composite contains more than one metal wire in its lumen, in which the more than one metal wires (21) are in the form of a stranded conductor.

2. The tubular composite as claimed in claim 1, further comprising at least one catalyst layer (7,9), wherein said at least one catalyst layer comprises hydrophobic additives and/or additives of proton-conducting material.

3. The tubular composite as claimed in claim 1, wherein braid (3) comprises metal wires or metal wire bundles and in which the metal is a corrosion-resistant metal or a corrosion-resistant alloy.

4. The tubular composite as claimed in claim 1, in which the tubular composite (1) is designed as a fuel cell element, and at least one catalyst layer (7, 9) is arranged both between the braid (3) of bundles of electron-conducting material selected from the group consisting of carbon fibers and metal wires and the layer (5) of an ion-conducting material, and above the layer (5) of the ion-conducting material, and in which the outwardly oriented catalyst layer (9) is covered by a further braid (11) of bundles of electron-conducting material selected from the group consisting of carbon fibers and metal wires.

5. The tubular composite as claimed in claim 4, in which the at least one catalyst layer (7,9) contains one or more elements from subgroup VII of the periodic table of elements.

6. The tubular composite as claimed in claim 5, in which the at least one catalyst layer (7,9) additionally contains at least one of charcoal, soot and graphite.

7. The tubular composite as claimed in claim 1, which is designed as an ion-exchange membrane.

8. The tubular composite as claimed in claim 7, in which an ion-conductive or electrically insulating spacer (13) is arranged between the braid (3) of bundles of an electron-conducting material selected from the group consisting of carbon fibers and metal wires and the layer (5) of an ion-conducting material.

9. The tubular composite as claimed in claim 8, in which a further spacer (15), which is covered by a further braid (17) of bundles an electron-conducting material selected from the group consisting of carbon fibers and metal wires, is arranged above the layer (5) of an ion-conducting material.

10. The tubular composite as claimed in claim 9, in which the further spacer (15) is designed as a braid of electrically insulating or ion-conducting fibers.

11. The tubular composite as claimed in claim 1, in which the ion-conducting material comprises an oxide.

12. The tubular composite as claimed in claim 11, in which the ion-conducting material comprises a solid oxide.

13. The tubular composite as claimed in claim 1, in which the carbon fibers and/or metal wires have a diameter of from 10 to 300 μm.

14. The tubular composite as claimed in claim 1, which is a hose with an internal diameter of 0.2 to 3 mm.

15. The tubular composite as claimed in claim 1, in which the ion-conducting material is designed as a membrane.

16. The tubular composite as claimed in claim 1, in which the ion-conducting material is at least one selected from the group consisting of sulfonated aromatic polyether ether ketones, perfluorosulfonic acid polymer, anionic polyaryl ethers and sulfonated perfluorinated polymers.

17. The tubular composite as claimed in claim 1, wherein the braids of electron-conducting material selected from the group consisting of carbon fibers and metal wires is an electrode.

18. The tubular composite as claimed in claim 1, wherein braid (3) comprises said bundles of electron conducting material selected from the group consisting of carbon fibers and carbon fibers together with metal wires or metal wire bundles and in which the bundles of carbon fibers have a diameter of from 0.1 to 2 mm.

19. The tubular composite as claimed in claim 18, wherein the bundles of carbon fibers have a diameter of from 0.2 to 2 mm.

20. A method for the continuous production of a tubular composite as claimed in claim 1, in which bundles of electron-conducting material selected from the group consisting of carbon fibers and metal wires are braided to form a hose from a braid of this electron-conducting material, and then the outer side of the braid, which is remote from the lumen of the hose, is coated with the ion-conducting material by pouring or spraying the ion-conducting material to the outer side of the braid.

21. The method as claimed in claim 20 for producing a tubular composite which is designed as a fuel cell element, wherein at least one catalyst layer is applied to an outer side of the hose and then a further braid of bundles and/or filaments or fibers of an electron-conducting material is then applied to the catalyst layer.

22. The method as claimed in claim 20 for producing a tubular composite which is designed as an ion exchange membrane, wherein the bundles of electron-conducting material selected from the group consisting of carbon fibers and metal wires are braided to form a hose from a braid of the electron-conducting material, following which a braid of electrically insulating or ion-conducting fibers is applied as a spacer, followed by a temporary intermediate layer which serves as a base for application of an ion-conducting layer, and then a layer of an ion-conducting material applied to this intermediate layer.

23. The method as claimed in claim 22, in which the temporary intermediate layer is a PVA (polyvinyl alcohol) layer.

24. The method as claimed in claim 22, in which the temporary intermediate layer is washed out after the tubular composite has been produced.

25. The method as claimed in claim 20, in which a further braid of electrically insulating or ion-conducting fibers is applied as a spacer to the layer of ion-conducting material, and then a further layer of an electron-conducting material is applied.

26. The method of claim 20, which further comprises drying the ion-conducting material applied to the outer side of the braid.

27. The method as claimed in claim 21, which further comprises drying the at least one catalyst layer.

28. The method as claimed in claim 27, wherein the at least one catalyst layer is dried after at least one of braiding of the hose and after the application of the ion-conducting material.

29. A module (50) comprising a frame (52) and a multiplicity of tubular composites (1) as claimed in claim 1, which are arranged in the frame (52) parallel and longitudinally with respect to the longitudinal axis of the frame (52).

30. The module as claimed in claim 29, in which the braid is in electrically conductive contact with an electron-conducting device.

31. The module as claimed in claim 30, in which the further braid (11, 17) which lies toward the outer surface of the tubular composite (1) is in electrically conductive contact with an outer connection (31).

32. The module as claimed in claim 29, in which the braid (3) which lies toward the lumen (19) of the tubular composite (1) is in electrically conductive contact with one or more metal wires (21).

33. The module as claimed in claim 29, in which tubular composites (81), which are connected electrically in parallel, are contained in the frame (52).

34. The module as claimed in claim 29, in which the tubular composites (1) are arranged in a matrix (54) in the frame (52), and the individual frames are electrically connected in series.

35. A reactor, containing at least one module as claimed in claim 29 and a housing.

36. The reactor as claimed in claim 35, which contains at least two modules which are electrically connected in series or in parallel to one another.

37. The module as claimed in claim 29, wherein the frame (52) is of cylindrical design.

* * * * *

UNITED STATES PATENT AND TRADEMARK OFFICE
CERTIFICATE OF CORRECTION

PATENT NO. : 7,150,932 B1 Page 1 of 1
APPLICATION NO. : 09/936117
DATED : December 19, 2006
INVENTOR(S) : Thomas Höfler et al.

It is certified that error appears in the above-identified patent and that said Letters Patent is hereby corrected as shown below:

On Title Page Item -75- should read,
Inventors: Thomas Höfler, Munchen (DE);
Norbert Stroh, Magstadt (DE)

Signed and Sealed this

First Day of May, 2007

JON W. DUDAS
*Director of the United States Patent and Trademark Office*